June 19, 1962 R. A. NICHOLS 3,040,260
CODED PULSE TRAIN SPACING TOLERANCE CHECKER
Filed Aug. 13, 1959
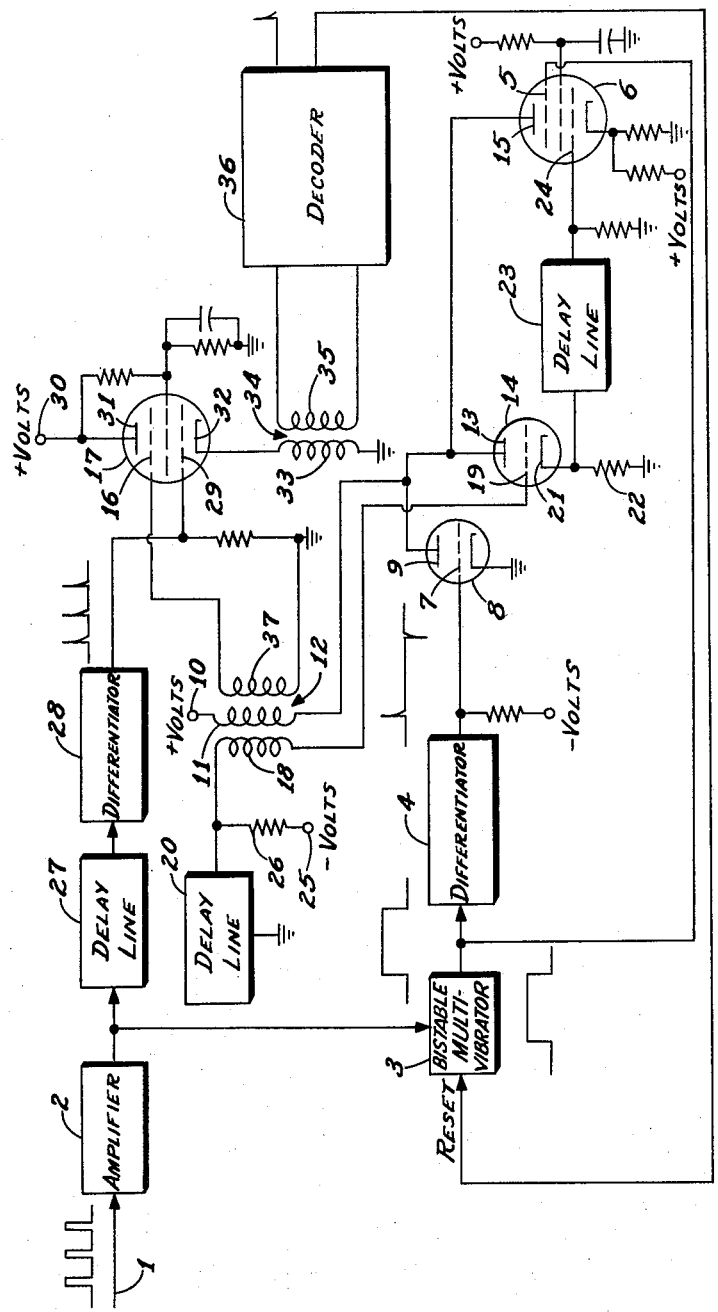
INVENTOR.
RICHARD A. NICHOLS
BY
ATTORNEY
AGENT United States Patent Office 3,040,260
Patented June 19, 1962

3,040,260
CODED PULSE TRAIN SPACING TOLERANCE
CHECKER
Richard A. Nichols, Richardson, Tex., assignor to Collins Radio Company, Cedar Rapids, Iowa, a corporation of Iowa
Filed Aug. 13, 1959, Ser. No. 833,502
3 Claims. (Cl. 328—110)

This invention pertains to electrical pulse cycling devices and particularly to combinations of pulse repeating devices with coincidence circuits that are applicable for passing pulses that have particular predetermined spacings. Certain radio transmitting systems transmit pulses having predetermined spacings for conveying particular intelligence to a receiving system. Means must be provided for checking the spacings between the pulses. The circuit of this invention is enabled by the reception at any random time of the first impulse of a series of pulses. All of the pulses of the series are passed from the input circuit to the output circuit only if the leading edge of each pulse occurs at an exact interval or multiple of that interval after the leading edge of each preceding pulse. Accordingly, this invention comprises means for differentiating incoming pulses and applying impulses derived from differentiating the pulses to a coincidence circuit, and means responsive to a first incoming pulse of a train for applying accurately spaced pulses to said coincidence circuit, said last means including a blocking oscillator having a control element connected to a first delay line for determining pulse width and a regenerative circuit with a second delay line for determining the spacings between pulses.

An object of this invention is to provide pulse testing devices operative in response to the reception of the first pulses of series or trains for passing only those succeeding pulses in the series that have predetermined accurate spacings relative to immediately preceding pulses.

Another object is to provide test circuits that having been reset at the end of a series of pulses are responsive instantaneously to first pulses of random pulse trains.

These and other objects, the following description, and the appended claims may be more readily understood with reference to the accompanying combination block and schematic diagram.

The incoming signal is applied to two different pulse forming circuits that are connected to a coincidence tube. One circuit operates in response to each individual pulse to form sharp impulses that are derived from differentiating the leading edges of the pulses. The other circuit includes a bistable multivibrator, a delayed feedback circuit, and a blocking oscillator for producing precisely spaced impulses for application to the coincidence circuit. The multivibrator operates to a particular state in response to reception of a first impulse and while the multivibrator is in this state, the blocking oscillator in cooperation with the delayed feedback circuit cycles repeatedly to generate precisely spaced impulses until the multivibrator circuit is reset at the end of an incoming pulse train. A pulse is passed to the output of the coincidence circuit for each incoming pulse as long as the incoming pulses are spaced accordingly to the accurate spacings of the locally generated impulses.

Incoming pulse trains are applied to input 1 of amplifier 2. A portion of the output of amplifier 2 is applied to one of two input circuits of multivibrator 3. Multivibrator 3 may be a conventional two-state multivibrator which is responsive to a positive voltage pulse output from amplifier 2 for providing an increased positive voltage in its output circuit and is responsive to the application of positive voltage pulse to its reset input for reducing the positive voltage in its output. Multivibrator 3 therefore provides a positive square wave in response to the application of a pair of pulses, each square wave having duration determined by the spacing between the positive pulse that is applied from amplifier 2 and the succeeding pulse that is applied to the reset input of the multivibrator.

The square wave output of the multivibrator is applied to the input of differentiator 4 for differentiating the leading edge of each of the square waves. The sharp positive impulse derived from differentiation is applied to control grid 7 of electron tube 8. The square wave output of multivibrator 3 is also applied to suppressor grid 5 of coincident tube 6. The duration of a series of accurately timed pulses is determined by the duration of the positive voltage from multivibrator 3. A pulse derived from differentiating the leading edge of the square wave starts the pulse cycling circuit and the termination of the positive square wave disables the pulse cycling circuit.

In response to the application of the positive impulse to control grid 7, tube 8 which is normally non-conductive, becomes momentarily conductive for causing a surge of current flow from a source of positive voltage that is connected to terminal 10 through winding 11 of the three winding transformer 12 to plate 9. The impulse from plate 9 is applied to parallel-connected plate 13 of blocking oscillator 14 and is also applied by magnetic induction through winding 18 to control grid 19 of tube 14. The voltage applied from winding 18 is in proper phase so that regenerative feedback exists between plate 9 and grid 7. The impulse is also applied inductively through winding 37 for applying a positive pulse to control grid 16 of coincident tube 17. The voltages applied to control grid 19 of blocking oscillator tube 14 cause an increase in current from terminal 10 through winding 11, plate 13, cathode 21, and resistor 22 to ground. Tube 14 conducts until a negative voltage is reflected from delay line 20 through winding 18 to control grid 19. After the pulse of reflected voltage biases the tube beyond cut-off, it is maintained non-conductive by the negative voltage which is applied from terminal 25 through grid resistor 26 and winding 18 to control grid 19 until a subsequent pulse is applied to plate 13.

The current flow through cathode resistor 22 develops a voltage pulse that is applied through delay line 23 to the control grid 24 of coincidence tube 6. While multivibrator 3 is in that state required for applying a positive voltage to suppressor grid 5 of tube 6, an impulse of current in response to the application of a positive voltage pulse to control grid 24, flows through winding 11 of transformer 12 to the plate 15 of tube 6. This impulse again starts regenerative action of blocking oscillator tube 14 for generating an impulse that is applied from transformer winding 37 to suppressor grid 16 of coincident tube 17. The train of pulses having spacings determined by the period of delay line 23 continues to be generated until multivibrator 3 is operated to that state for removing the positive potential from suppressor grid 5.

Incoming pulses derived from the output of amplifier 2 are applied successively through delay line 27 and differentiator 28 to control grid 29 of coincident tube 17. Delay line 27 causes only a slight delay in the pulses to compensate for the rise time in the pulse cycling circuit. The differentiator 28 provides positive impulses derived from differentiating the leading edges of the incoming pulses. When the impulse that is applied from differentiator 28 to control grid 29 coincides with the impulse applied to grid 29 by transformer 12 of the blocking oscillator circuit, the plate circuit of tube 17 becomes momentarily conductive and current flows from terminal 30 that is connected to a source of positive voltage to plate 31, cathode 32, and through winding 33 of output transformer 34 to ground. Consequently in response to the coincidence of the pulses that are applied to grids 16 and 29, a pulse is induced into secondary winding 35 of transformer 34 for application to decoder 36. The decoder 36, which may comprise delay lines and an indicator, will show the amplitude and occurrence of the pulses so that they can be compared with the desired characteristics of the transmitted pulses. Conventional circuitry can be arranged to provide a positive pulse in response to the reception of the final pulse of each train for application to the reset input circuit of multivibrator 3. One type of decoder having a delayed line and a coincidence circuit for applying positive pulse is described on page 313, and shown in FIGURE 10-34c of "Pulse and Digital Circuits" by Millman and taub, published by McGraw-Hill Book Company, Inc., New York, 1956.

The pulse cycling circuit can be used independently of that coincident circuit which receives individual pulses from differentiation of the incoming pulses. The pulse cycling circuit will continue to operate so long as the multivibrator is in that state for applying a positive voltage to suppressor grid 5 of coincident tube 6. The width of the generated pulses is determined by the delay time of the delay line 20 and the spacing between the pulses is determined by the delay time of delay line 23.

Since the width and the spacing of the pulses are determined by delay lines that have relatively constant characteristics, pulses that are accurately spaced are generated for comparison with incoming pulses. An impulse will be applied to decoder 36 whenever an incoming pulse coincides with a locally generated pulse. Obviously if the spacings of the incoming pulses differ from that of the generated pulses, no output will be attained across winding 35 of transformer 34. Also, if the train of pulses includes spaces in which pulses are absent, the pulses will also be absent in the output of transformer 34. Obviously the spacings between trains of pulses are not effective in changing the operation of the circuit for the pulse cycling circuit is disabled at the end of each train of pulses and is instantly enabled at the beginning of each succeeding train of pulses. Through use of this invention reliable, accurate, simple circuitry has been obtained for ascertaining that received pulses have predetermined spacings.

Although this invention has been described with respect to a particular embodiment thereof, it is not to be so limited as changes and modifications may be made therein which are within the full scope of the invention as defined by the appended claims.

What is claimed is:

1. A device for checking spaces between electrical pulses comprising a coincidence circuit having first and second control circuits and an output circuit, said coincidence circuit responsive to the simultaneous application of an impulse to each of its control circuits for transferring a pulse to its output circuit, means responsive to the application of each incoming pulse for applying a sharp impulse to said first control circuit, spacings between successive ones of said sharp impulses coinciding accurately with the spacings between the leading edges of corresponding incoming pulses, a pulse cycling circuit for generating pulses with accurate predetermined spacings, said pulse cycling circuit having an enabling control circuit, a disabling control circuit and an output circuit, a bistable control circuit having first and second input terminals and an output terminal, the output terminal of said bistable control circuit being connected to said enabling control circuit and to said disabling control circuit, said first input terminal of said bistable control circuit being connected for receiving said incoming pulses, said bistable control circuit being operated to its first state for enabling said pulse cycling circuit in response to the application of any first incoming pulse of a series of impulses to its first input terminal, reset means connected between said output circuit of said coincidence circuit and said second input terminal of said bistable control circuit, said reset means responsive to the termination of a series of pulses of predetermined spacings for operating said bistable control circuit to its second state for disabling said pulse cycling circuit.

2. In a checking device as claimed in claim 1, said pulse cycling circuit including a blocking oscillator having an electron tube with at least a cathode, a grid, and a plate, said plate being inductively coupled in a regenerative sense to said grid, a first delay line connected to said grid, said enabling control circuit including means operating in response to said bistable control circuit being operated to said first state for applying a sharp impulse to said inductively coupled plate and grid for increasing current flow between the plate and the cathode of said tube, said delay line reflecting said pulse after an interval determined by the characteristics of said line in the required phase for cutting off said plate current, thereby determining the width of each of the successive pulses generated by said blocking oscillator, and feed back means for delaying each of the successive generated pulses and applying said delayed pulses successively to said inductively coupled grid and plate circuits for continually recycling said blocking oscillator.

3. In a checking device as claimed in claim 2, said feedback means including a second coincidence circuit having third and fourth control circuits and a second output circuit, a second delay line connected between said cathode of said blocking oscillator tube and said third control circuit, said disabling control circuit including said fourth control circuit, and said second output circuit being connected to said plate of said blocking oscillator tube, whereby said second delay line determines the spacing between the pulses generated by said blocking oscillator.

References Cited in the file of this patent

UNITED STATES PATENTS 2,669,706      Gray                 Feb. 16, 1954